(12) United States Patent
D'Aguanno et al.

(10) Patent No.: US 6,538,794 B1
(45) Date of Patent: Mar. 25, 2003

(54) EFFICIENT NON-LINEAR PHASE SHIFTING USING A PHOTONIC BAND GAP STRUCTURE

(76) Inventors: Giuseppe D'Aguanno, Via Arigni 142, Cassino (FR) (IT), 03042; Marco Centini, Via Fanfulla da Lodi 15, San Benedetto del Tronto (AP) (IT), 63039; Concita Sibilia, Via Francesco Redi 5-00161, Rome (IT); Michael Scalora, 15037 Ashmont Cir., Huntsville, AL (US) 35803; Mark Bloemer, 15829 Sanderson La., Athens, AL (US) 35613

( * ) Notice: Subject to any disclaimer, the term of this patent is extended or adjusted under 35 U.S.C. 154(b) by 0 days.

(21) Appl. No.: 09/672,835

(22) Filed: Sep. 29, 2000

Related U.S. Application Data
(60) Provisional application No. 60/156,961, filed on Sep. 30, 1999.

(51) Int. Cl.[7] .............................. G02F 1/01; G02F 1/03; H01S 3/10
(52) U.S. Cl. ...................... 359/279; 359/248; 359/260; 372/22
(58) Field of Search ................................. 359/279, 248, 359/260, 263, 586, 587, 588, 589; 372/22, 21

(56) References Cited

U.S. PATENT DOCUMENTS

| | | | |
|---|---|---|---|
| 3,410,625 A | 11/1968 | Edwards | 359/588 |
| 3,637,294 A | 1/1972 | Berthold, III | 359/588 |
| 3,682,528 A | 8/1972 | Apfel et al. | 359/360 |
| 3,697,153 A | 10/1972 | Zycha | 359/588 |
| 3,698,946 A | 10/1972 | Kaspaul et al. | 117/211 |
| 3,706,485 A | 12/1972 | Fawcett et al. | 359/588 |
| 3,759,604 A | 9/1973 | Thelen | 359/588 |

(List continued on next page.)

FOREIGN PATENT DOCUMENTS

| | | | |
|---|---|---|---|
| EP | 0 012 439 A1 | 12/1979 | G02F/1/21 |
| EP | 0 782 017 A2 | 7/1997 | G02B/6/12 |
| EP | 0 782 017 A3 | 8/1998 | G02B/6/12 |
| GB | 1406940 | 9/1975 | G02B/1/10 |
| JP | 59-151108 | 8/1984 | G02B/5/20 |
| JP | 64-80908 | 3/1989 | G02B/5/28 |
| JP | 2-187732 | 7/1990 | G02F/1/23 |
| WO | WO 96/11516 | 4/1996 | H01S/3/085 |

OTHER PUBLICATIONS

Tong, B.Y. et al., "Fluorescence–lifetime measurements in monodispersed suspensions of polystyrene particles," *J. Opt. Soc. Am. B*, Optical Society of America, vol. 10, No. 2, Feb. 1993, pp. 356–359.

Wijekoon, W.M.K.P. et al., "Second–harmonic generation studies of differences in molecular orientation of Langmuir–Blodgett films fabricated by vertical and horizontal dipping techniques," *J. Opt. Soc. Am. B*, Optical Society of America, vol. 10, No. 2, Feb. 1993, pp. 213–221.

(List continued on next page.)

*Primary Examiner*—Hung Xuan Dang
*Assistant Examiner*—Tim Thompson
(74) *Attorney, Agent, or Firm*—Sterne, Kessler, Goldstein & Fox P.L.L.C.

(57) ABSTRACT

A device is provided for generating a photonic signal having a phase different from an input photonic signal that is incident on the device. The input photonic signal has an signal frequency, signal bandwidth, and a signal intensity. The device comprises a plurality of material layers. The material layers are arranged such that the device exhibits a photonic band gap structure. The photonic band gap structure exhibits a transmission band edge that corresponds to the input photonic signal frequency. A second photonic signal is generated at a second photonic frequency preferably close to a second band edge. The interaction of the input photonic signal with the second photonic signal generates a phase shift of order $\pi$ for relatively small input intensities.

32 Claims, 7 Drawing Sheets

U.S. PATENT DOCUMENTS

| | | | |
|---|---|---|---|
| 3,853,386 A | 12/1974 | Ritter et al. | 359/588 |
| 3,885,855 A | 5/1975 | Gross | 359/360 |
| 3,889,026 A | 6/1975 | Groth | 428/34 |
| 3,901,997 A | 8/1975 | Groth | 428/428 |
| 3,914,023 A | 10/1975 | Thelen | 359/588 |
| 3,978,273 A | 8/1976 | Groth | 428/434 |
| 4,179,181 A | 12/1979 | Chang | 359/360 |
| 4,189,205 A | 2/1980 | Vandehei | 359/360 |
| 4,229,066 A | 10/1980 | Rancourt et al. | 359/359 |
| 4,240,696 A | 12/1980 | Tracy et al. | 359/578 |
| 4,269,481 A | 5/1981 | Yeh et al. | 359/259 |
| 4,441,789 A | 4/1984 | Pohlack | 359/588 |
| 4,488,775 A | 12/1984 | Yamamoto | 359/588 |
| 4,525,687 A | 6/1985 | Chemla et al. | 332/7.51 |
| 4,556,277 A | 12/1985 | Fan et al. | 359/360 |
| 4,590,118 A | 5/1986 | Yatabe et al. | 428/215 |
| H182 H | 1/1987 | Heller | 340/568 |
| 4,726,655 A | 2/1988 | Mahlein | 359/588 |
| 4,756,602 A | 7/1988 | Southwell et al. | 359/588 |
| 4,770,496 A | 9/1988 | Mahlein | 359/588 |
| 4,773,717 A | 9/1988 | Pai et al. | 359/589 |
| 4,838,648 A | 6/1989 | Phillips et al. | 359/588 |
| 4,846,551 A | 7/1989 | Rancourt et al. | 359/588 |
| 4,915,494 A | 4/1990 | Shipley et al. | 359/848 |
| 5,035,485 A | 7/1991 | Kageyama | 359/588 |
| 5,071,206 A | 12/1991 | Hood et al. | 359/360 |
| 5,111,329 A | 5/1992 | Gajewski et al. | 359/275 |
| 5,119,232 A | 6/1992 | Daley et al. | 359/359 |
| 5,148,504 A | 9/1992 | Levi et al. | 385/14 |
| 5,170,290 A | 12/1992 | Land et al. | 359/579 |
| 5,179,468 A | 1/1993 | Gasloli | 359/359 |
| 5,187,461 A | 2/1993 | Brommer et al. | 333/219.1 |
| 5,212,584 A | 5/1993 | Chung | 359/260 |
| 5,225,930 A | 7/1993 | Land et al. | 359/578 |
| 5,233,464 A | 8/1993 | Costich | 359/359 |
| 5,239,406 A | 8/1993 | Lynam | 359/275 |
| 5,247,528 A | 9/1993 | Shinozaki et al. | 372/22 |
| 5,262,894 A | 11/1993 | Wheatley et al. | 359/586 |
| 5,268,785 A | 12/1993 | Crenshaw et al. | 359/244 |
| 5,302,449 A | 4/1994 | Eby et al. | 428/336 |
| 5,315,430 A | 5/1994 | Brennan et al. | 359/248 |
| 5,315,437 A | 5/1994 | Alfano et al. | 359/588 |
| 5,337,183 A | 8/1994 | Rosenblatt | 359/248 |
| 5,345,328 A | 9/1994 | Fritz et al. | 359/248 |
| 5,355,245 A | 10/1994 | Lynam | 359/267 |
| 5,372,874 A | 12/1994 | Dickey et al. | 428/216 |
| 5,406,573 A | 4/1995 | Ozbay et al. | 372/43 |
| 5,424,559 A | 6/1995 | Kasahara | 257/21 |
| 5,433,988 A | 7/1995 | Fukuda et al. | 428/141 |
| 5,440,421 A | 8/1995 | Fan et al. | 359/344 |
| 5,448,404 A | 9/1995 | Schrenk et al. | 359/584 |
| 5,457,570 A | 10/1995 | Lu et al. | 359/361 |
| 5,471,180 A | 11/1995 | Brommer et al. | 333/202 |
| 5,480,722 A | 1/1996 | Tomonaga et al. | 428/428 |
| 5,493,442 A | 2/1996 | Buchholz et al. | 359/359 |
| 5,506,037 A | 4/1996 | Termath | 428/216 |
| 5,506,919 A | 4/1996 | Roberts | 385/1 |
| 5,513,039 A | 4/1996 | Lu et al. | 359/584 |
| 5,514,476 A | 5/1996 | Hartig et al. | 428/426 |
| 5,552,882 A | 9/1996 | Lyons et al. | 356/73.1 |
| 5,557,462 A | 9/1996 | Hartig et al. | 359/585 |
| 5,559,825 A | 9/1996 | Scalora et al. | 372/96 |
| 5,563,734 A | 10/1996 | Wolfe et al. | 359/360 |
| 5,591,529 A | 1/1997 | Braatz et al. | 428/457 |
| 5,595,825 A | 1/1997 | Guiselin | 428/428 |
| 5,615,289 A | 3/1997 | Duck et al. | 385/24 |
| 5,740,287 A | 4/1998 | Scalora et al. | 385/6 |
| 5,751,466 A | 5/1998 | Dowling et al. | 359/248 |
| 5,796,902 A | 8/1998 | Bhat et al. | 385/122 |
| 5,801,378 A | 9/1998 | Hane et al. | 250/237 |
| 5,907,427 A | 5/1999 | Scalora et al. | 359/248 |
| 5,909,035 A | 6/1999 | Kim | 257/59 |
| 5,943,155 A | 8/1999 | Goossen | 359/247 |
| 5,949,571 A | 9/1999 | Goossen et al. | 359/291 |
| 6,028,693 A * | 2/2000 | Fork et al. | 359/248 |
| 6,304,366 B1 * | 10/2001 | Scalora et al. | 359/328 |

OTHER PUBLICATIONS

Yablanovich, E., "Photonic band–gap structures," *J. Opt. Soc. Am. B,* Optical Society of America, vol. 10, No. 2, Feb. 1993, pp. 283–295.

Bendickson, J.M. et al., "Analytic expressions for the electromagnetic mode density in finite, one–dimensional, photonic band–gap structures," *Physical Review E,* The American Physical Society, vol. 53, No. 4–B, Apr. 1996, pp. 4107–4121.

Bloemer, M.J. and Scalora, M., "Transmissive properties of AG/MgF$_2$ photonic band gaps," *Applied Physics Letters,* American Institute of Physics, vol. 72, No. 14, Apr. 6, 1998, pp. 1676–1678.

Bouché, N. et al., "Dynamics of gain in vertical cavity lasers and amplifiers at 1.53 $\mu$m using femtosecond photoexcitation," *Applied Physics Letters,* American Institute of Physics, vol. 73, No. 19, Nov. 9, 1998, pp. 2718–2720.

Centini, M. et al., "Dispersive properties of finite, one–dimensional photonic band gap structures: Applications to nonlinear quadratic interactions," *Physical Review E,* The American Physical Society, vol. 60, No. 4–B, Oct. 1999, pp. 4891–4898.

Cojocaru, C. et al., "Active reflection via a phase–insensitive quadratic nonlinear interaction within a microcavity," *Applied Physics Letters,* American Institute of Physics, vol. 74, No. 4, Jan. 25, 1999, pp. 504–506.

D'Aguanno, G.D. et al., "Enhancement of $\chi^{(2)}$ cascading processes in one–dimensional photonic bandgap structures," *Optics Letters,* Optical Society of America, vol. 24, No. 23, Dec. 1, 1999, pp. 1663–1665.

DeSalvo, R. et al., "Self–focusing and self–defocusing by cascaded second–order effects in KTP," *Optics Letters,* Optical Society of America, vol. 17, No. 1, Jan. 1, 1992, pp. 28–30.

DIALOG File 348 (European Patents) English Language Patent Abstract for EP 0 012 439 A1, published Jun. 25, 1990, p. 1.

DIALOG File 347 (JPO & JAPIO) English Language Patent Abstract for JP 59–151108, published Aug. 29, 1984, p. 1.

Dowling, J.P. et al., "The photonic band edge laser: A new approach to gain enhancement," *Journal of Applied Physics,* American Institute of Physics, vol. 75, No. 4, Feb. 15, 1994, pp. 1896–1899.

Fowles, Grant R., *Introduction to Modern Optics,* Second Edition, 1975, Holt, Rhinehart and Winston, pp. v–viii, 33–38, 52–55 and 96–103.

Grétillat, M.–A. et al., "Electrostatic Polysilicon Microrelays Integrated with MOSFETs," *Proceedings Of Micro Electro Mechanical Systems,* IEEE, Jan. 25–28, 1994, pp. 97–101.

Haus, J.W. et al., "Enhanced second–harmonic generation in media with a weak periodicity," *Physical Review A,* The American Physical Society, vol. 57, No. 3, Mar. 1988, pp. 2120–2128.

"Indicators and displays," *Machine Design: 1988 Reference Issue Series,* Penton Publishing Inc., May 19, 1988, pp. 190–200.

Joannopoulos, John D. et al., *Photonic Crystals: Molding the Flow of Light*, 1995, Princeton University Press, (copy of entire book provided).

Lewis, C.F., "Optical Coatings: More Than Meets the Eye," *Materials Engineering*, Penton Publishing Inc., Nov. 1989, pp. 29–32.

Macleod, H.A., *Thin–Film Optical Filters*, Second Edition, 1986, Macmillan Publishing Company, (copy of entire book provided).

Marion, Jerry B., *Classical Electromagnetic Radiation*, 1965, Academic Press Inc., pp. ix–xv, 148–152, 170–177.

Martorell, J. et al., "Pseudo–metal reflection at the interface between a linear and a nonlinear material," *Optics Communications*, Elsevier Science B.V., vol. 144, Nos. 1–3, Dec. 1, 1997, pp. 65–69.

Mooney, T.A., "Which Coating Process Should I Choose?," *Lasers & Optronics*, Jul. 1988, pp. 39–44.

Pasachoff, Jay M. and Kutner, Marc L., *University Astronomy*, 1978, W.B. Saunders Company, pp. ix–xvii and 177–239.

Patent Abstracts of Japan, vol. 018, No. 095 (E–1509), JP 05 299751 A, published Nov. 12, 1993.

Patent Abstracts of Japan, vol. 014, No. 468 (P–1115), JP 2187732, published Jul. 23, 1990.

Patent Abstracts of Japan, vol. 008, No. 081 (E–238), JP 59 000977 A, published Jan. 6, 1984.

Petersen, K.E., "Micromechanical Membrane Switches on Silicon," *IBM J. Res. Develop.*, vol. 23, No. 4, Jul. 1979, pp. 376–385.

Rao, Y.J. et al., "Spatially–multiplexed fiber–optic Bragg grating strain and temperature sensor system based on interferometric wavelength–shift detection," *Electronics Letters*, The Institution of Electrical Engineers, vol. 31, No. 12, Jun. 8, 1995, pp. 1009–1010.

Scalora, M. and Crenshaw, M.E., "A beam propagation method that handles reflections," *Optics Communications*, Elsevier Science B.V., vol. 108, Nos. 4–6, Jun. 1, 1994, pp. 191–196.

Scalora, M. et al., "Dipole emission rates in one–dimensional photonic band–gap materials," *Applied Physics B*, Supplement to vol. B 60, No. 2/3, 1995, Springer–Verlag, pp. S57–S61.

Scalora, M. et al., "Optical Limiting and Switching of Ultrashort Pulses in Nonlinear Photonic Band–Gap Materials," *Physical Review Letters*, The American Physical Society, vol. 73, No. 10, Sep. 5, 1994, pp. 1368–1371.

Scalora, M. et al., "The photonic band–edge optical diode," *Journal of Applied Physics*, American Institute of Physics, vol. 76, No. 4, Aug. 15, 1994, pp. 2023–2026.

Scalora, M. et al., "Pulse propagation near highly reflective surfaces: applications to photonic band–gap structures and the question of superluminal tunneling times," *Physical Review A.*, The American Physical Society, vol. 52, No. 1, Jul. 1995, pp. 726–734.

Scalora, M. et al., "Pulsed second–harmonic generation in non–linear, one–dimensional, periodic structures," *Physical Review A*, The American Physical Socity, vol. 56, No. 4, Oct. 1997, pp. 3166–3174.

Scalora, M. et al., "Ultrashort pulse propagation at the photonic band edge: large tunable group delay with minimal distortion and loss," *Physical Review E*, The American Physical Society, vol. 54, No. 2, Aug. 1996, pp. R1078–R1081.

Sprung, D.W.L. et al., "Scattering by a finite periodic potential," *American Journal of Physics*, American Association of Physics Teachers, vol. 61, No. 12, Dec. 1993, pp. 1118–1124.

Sze, S.M., *Physics of Semiconductor Devices*, Second Edition, 1981, John Wiley & Sons, pp. ix–xii and 681–742.

Sze, S.M., *Semiconductor Devices: Physics & Technology*, 1985, John Wiley & Sons, pp. ix–xi and 252–467.

Tocci, M.D. et al., "Thin–film nonlinear optical diode," *Applied Physics Letters*, American Institute of Physics, vol. 66, No. 18, May 1, 1995, pp. 2324–2326.

Ward, A.J. et al., "Photonic dispersion surfaces," *Journal of Physics: Condensed Matter*, IOP Publishing Ltd., vol. 7, No. 10, Mar. 6, 1995, pp. 2217–2224.

Yao, J.J. et al., "A Surface Micromachined Miniature Switch for Telecommunications Applications with Signal Frequencies from DC up to 4 Ghz," *Transducers '95*, Foundation for Sensor and Actuator Technology, 1995, pp. 384–387.

Yariv, Amnon and Yeh, Pochi, *Optical Waves in Crystals: Propagation and Control of Laser Radiation*, 1984, John Wiley & Sons, pp. vii–xi and 439–447.

Akhmediev, N. et al., "Stability analysis of even and odd waves of symmetric nonlinear planar optical waveguides," *J. Opt. Soc. Am. B*, Optical Society of America, vol. 10, No. 2, Feb. 1993, pp. 230–236.

Bowden, C.M. et al., "Development and Applications of Materials Exhibiting Photonic Band Gaps," *J. Opt. Soc. Am. B*, Optical Society of America, vol. 10, No. 2, Feb. 1993, pp. 279–280.

Brown, E.R. et al., "Radiation properties of a planar antenna on a photonic–crystal substrate," *J. Opt. Soc. Am. B*, Optical Society of America, vol. 10, No. 2, Feb. 1993, pp. 404–407.

Bullock, D.L. et al., "Photonic band structure investigation of two–dimensional Bragg reflector mirrors for semiconductor laser mode control," *J. Opt. Soc. Am. B*, Optical Society of America, vol. 10, No. 2, Feb. 1993, pp. 399–403.

Chernov, V.E. and B.A. Zon, "Depolarization of laser radiation in a nonlinear medium," *J. Opt. Soc. Am. B*, Optical Society of America, vol. 10, No. 2, Feb. 1993, pp. 210–212.

Chu, D.Y. and S.–T. Ho, "Spontaneous emission from excitons in cylindrical dielectric waveguides and the spontaneous–emission factor of microcavity ring lasers," *J. Opt. Soc. Am. B*, Optical Society of America, vol. 10, No. 2, Feb. 1993, pp. 381–390.

Crook, R.J. et al., "Long–range optical modes supported by a strongly absorbing thin organic film," *J. Opt. Soc. Am. B*, Optical Society of America, vol. 10, No. 2, Feb. 1993, pp. 237–243.

De Martini, F. et al., "Spontaneous and stimulated emission in the thresholdless microlaser," *J. Opt. Soc. Am. B*, Optical Society of America, vol. 10, No. 2, Feb. 1993, pp. 360–380.

Dowling, J.P. and C.M. Bowden, "Beat radiation from dipoles near a photonic band edge," *J. Opt. Soc. Am. B*, Optical Society of America, vol. 10, No. 2, Feb. 1993, pp. 353–355.

Dutta, B. et al., "Squeezed states, photon–number distributions, and U(1) invariance," *J. Opt. Soc. Am. B*, Optical Society of America, vol. 10, No. 2, Feb. 1993, pp. 253–264.

Erdogan, T. et al., "Enhancement and inhibition of radiation in cylindrically symmetric, periodic structures," *J. Opt. Soc. Am. B*, Optical Society of America, vol. 10, No. 2, Feb. 1993, pp. 391–398.

Gaylord, T.K. et al., "Application of electromagnetics formalism to quantum–mechanical electron–wave propagation in semiconductors," *J. Opt. Soc. Am. B,* Optical Society of America, vol. 10, No. 2, Feb. 1993, pp. 333–339.

Genack, A.Z. and N. Garcia, "Electromagnetic localization and photonics," *J. Opt. Soc. Am. B,* Optical Society of America, vol. 10, No. 2, Feb. 1993, pp. 408–413.

Helmfrid, S. et al., "Influence of various imperfections on the conversion efficiency of second–harmonic generation in quasi–phase–matching lithium niobate waveguides," *J. Opt. Soc. Am. B,* Optical Society of America, vol. 10, No. 2, Feb. 1993, pp. 222–229.

Kilin, S. Ya. and I.I. Fedchenia, "Statistics of random spikes in the intensity of stimulated Raman scattering: initiation by spatially distributed fluctuations," *J. Opt. Soc. Am. B,* Optical Society of America, vol. 10, No. 2, Feb. 1993, pp. 199–209.

Kurizki, G. et al., "Quantum electrodynamics in photonic band gaps: atomic–beam interaction with a defect mode," *J. Opt. Soc. Am. B,* Optical Society of America, vol. 10, No. 2, Feb. 1993, pp. 346–352.

Leoński, W., "Squeezed–state effect on bound–continuum transitions," *J. Opt. Soc. Am. B,* Optical Society of America, vol. 10, No. 2, Feb. 1993, pp. 244–252.

Leung, K.M., "Defect modes in photonic band structures: a Green's function approach using vector Wannier functions," *J. Opt. Soc. Am. B,* Optical Society of America, vol. 10, No. 2, Feb. 1993, pp. 303–306.

Maradudin, A.A. and A.R. McGurn, "Photonic band structure of a truncated, two–dimensional, periodic dielectric medium," *J. Opt. Soc. Am. B,* Optical Society of America, vol. 10, No. 2, Feb. 1993, pp. 307–313.

Meade, R.D. et al., "Nature of the photonic band gap: some insights from a field analysis," *J. Opt. Soc. Am. B,* Optical Society of America, vol. 10, No. 2, Feb. 1993, pp. 328–332.

Montemezzani, G. et al., "Photorefractive charge compensation at elevated temperatures and application to $KNbO_3$," *J. Opt. Soc. Am. B,* Optical Society of America, vol. 10, No. 2, Feb. 1993, pp. 171–185.

Mossberg, T.W. and M. Lewenstein, "Radiative properties of strongly driven atoms in the presence of photonic bands and gaps," *J. Opt. Soc. Am. B,* Optical Society of America, vol. 10, No. 2, Feb. 1993, pp. 340–345.

Robertson, W.M. et al., "Measurement of the photon dispersion relation in two–dimensional ordered dielectric arrays," *J. Opt. Soc. Am. B,* Optical Society of America, vol. 10, No. 2, Feb. 1993, pp. 322–327.

Smith, D.R. et al., "Photonic band structure and defects in one and two dimensions," *J. Opt. Soc. Am. B,* Optical Society of America, vol. 10, No. 2, Feb. 1993, pp. 314–321.

Sözüer, H. Sami and J. W. Haus, "Photonic bands: simple–cubic lattice," *J. Opt. Soc. Am. B,* Optical Society of America, vol. 10, No. 2, Feb. 1993, pp. 296–302.

Sugawara, T. et al., "Instability in a $CO_2$ sequence–band laser with a saturable absorber and vibration–to–vibration energy transfer processes," *J. Opt. Soc. Am. B,* Optical Society of America, vol. 10, No. 2, Feb. 1993, pp. 265–270.

Ashcroft, Neil W. and Mermin, N. David, *Solid State Physics,* Holt, Rinehart and Winston, 1976, pp. xi–xiii and 765–766.

Assanto, Gaetano, "Quadratic Cascading: Effects and Applications," *Beam Shaping and Control with Nonlinear Optics,* (ed. By Kajzar and Reinisch), Plenum Press, 1998, pp. vii–viii and 341–374.

Ball, G.A. and Morey, W.W., "Continuously tunable single–mode erbium fiber laser," *Optics Letters,* Optical Society of America, vol. 17, No. 6, Mar. 15, 1992, pp. 420–422.

Zahavi, O. et al., "Study of amplified spontaneous emission systems by the ray–tracing technique," *J. Opt. Soc. Am. B,* Optical Society of America, vol. 10, No. 2, Feb. 1993, pp. 271–278.

Ziolkowski, R.W. and J.B. Judkins, "Full–wave vector Maxwell equation modeling of the self–focusing of ultrashort optical pulses in a nonlinear Kerr medium exhibiting a finite response time," *J. Opt. Soc. Am. B,* Optical Society of America, vol. 10, No. 2, Feb. 1993, pp. 186–198.

Translation of Japanese Patent Publication No. 64–80908.

\* cited by examiner

EFFICIENT NON-LINEAR PHASE SHIFTING USING A PHOTONIC BAND GAP STRUCTURE

CROSS-REFERENCE TO RELATED APPLICATION

This patent application claims priority to and is entitled to the benefit of Provisional Patent Application No. 60/156,961, filed Sep. 30, 1999 entitled "Efficient Non-Linear Phase Shifting Using a Photonic Band Gap Structure." This provisional application is incorporated herein by reference in its entirety.

STATEMENT REGARDING FEDERALLY-SPONSORED RESEARCH AND DEVELOPMENT

This invention was made with Government support under contract DAAH01-98-P-R019 awarded by the Department of Defense. The Government has certain rights in the invention.

BACKGROUND OF THE INVENTION

1. Field of the Invention

This invention relates to photonic band gap technology.

2. Related Art

In recent years, advances in photonic technology have generated a trend toward the integration of electronic and photonic devices. These devices offer an array of advantages over conventional electronic devices. For example, they can provide enhanced speed of operation and reduced size. In addition, these devices provide robustness to environmental changes, such as rapid temperature variations, increased lifetime, and the ability to handle high repetition rates. These structures can be made of metals, semiconductor materials, ordinary dielectrics, or any combination of these materials.

In photonic band gap (PBG) structures, electromagnetic field propagation is forbidden for a range of frequencies, and allowed for others. The nearly complete absence of some frequencies in the transmitted spectrum is referred to as a photonic band gap (PBG), in analogy to semiconductor band gaps. This phenomenon is based on the interference of light. For frequencies inside the band gap, forward-propagating and backward-propagating signal components can destructively cancel inside the structure, leading to complete reflection.

For example, recent advancements in PBG structures have been made in the development of a photonic band edge nonlinear optical limiter and switch. See M. Scalora, et al., *Optical Limiting and Switching of Ultrashort Pulses in Nonlinear Photonic Band-Gap Materials*, Physical Review Letters 73:1368 (1994) (incorporated herein by reference in its entirety). Also, advancements in photonic technology have been achieved with the development of the nonlinear optical diode. See M. Scalora et al., *The Photonic Band-Edge Optical Diode*, Journal of Applied Physics 76:2023 (1994) (incorporated by reference herein in its entirety). In addition, the physical processes involved in the photonic signal delay imparted by a uniform PBG structure are described in detail in Scalora et al., *Ultrashort Pulse Propagation at The Photonic Band Edge: Large Tunable Group Delay with Minimal Distortion and Loss*, Phys. Rev. E Rapid Comm. 54(2), R1078–R1081 (August 1996) (incorporated by reference herein in its entirety).

What is needed is a device that performs phase shifting of an electromagnetic signal that is compact in size, performs with low intensity input signals, and can be manufactured by conventional techniques.

SUMMARY OF THE INVENTION

The present invention generally relates to a device and method of creating an optical signal phase shift using a compact and readily made structure. For example, this structure may have a length that is less than 10 micrometers. This compact structure enables phase shifts of order $\pi$ for low intensity input signals.

According to one embodiment of the present invention, a device is provided for generating a photonic signal having a phase different from an input photonic signal that is incident on the device. The input photonic signal has a signal frequency, a signal bandwidth, and a signal intensity. The device comprises a plurality of material layers. The material layers are arranged such that the device exhibits a photonic band gap structure. The photonic band gap structure exhibits a transmission band edge that corresponds to the input photonic signal frequency. A second photonic signal is generated at a second photonic frequency preferably close to a second band edge. The interaction of the input photonic signal with the second photonic signal generates a phase shift of order $\pi$ for relatively small input intensities. The interaction of the input photonic signal with the arrangement of layers generates a phase shift.

The plurality of material layers can include a plurality of first material layers and a plurality of second material layers. The first and second material layers can be arranged in a periodically alternating manner or in an aperiodic manner such that the arrangement formed therefrom exhibits the photonic band gap structure. The first material layer can have a first index of refraction and the second material layer can have a second index of refraction that is different from the first index of refraction. Also, the first material layer can have a first thickness and said second material layer can have a second thickness that is different from the first thickness. These first and second material layers can respectively comprise $Al_2O_3$ and $Al_{30\%}Ga_{70\%}As$ semiconductor layers, where these layers are formed on a semiconductor substrate or a dielectric substrate.

The first photonic signal can be tuned at the first resonance near the first band edge of the band gap structure and the second photonic signal can be tuned at the first resonance near the second band edge of the band gap structure. Moreover, the first and second photonic signals can be phase mismatched.

Further embodiments, features, and advantages of the present inventions, as well as the structure and operation of the various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview of the Present Invention

Large phase shifts, of order $\pi$, are desirable at low power for applications to devices that rely on interference effects for their functionality. One example of the current state of the art is described in the following publication: R. De Salvo, D. J. Hagan, M. Sheik-Bahae, G. Stegeman, H. Vanherzeele, E. W. Van Stryland, Optics Letters Volume 17, page 28 (1992) (incorporated herein by reference in its entirety). This reference describes a pump beam that is injected inside a nonlinear material whose length is a few millimeters. In this reference, the pump beam's input intensity is 30 gigawatts per square centimeter to achieve phase shifts of order $\pi$.

This invention relates to the phase shifting of photonic signals at certain frequencies. In particular, the present invention relates to the use of a cascading process in a photonic band gap (PBG) structure to produce phase shifts. The present invention is a photonic band gap device. According to the present invention, fields frequencies are chosen at a device's respective band edges, where the density of modes is high, and wave velocity is low. This tuning enables the device to support phase shifts of order $\pi$ at relatively low input intensities. In particular, with respect to device length, the present invention provides an improvement over the example described in Salvo, et al. by at least three orders of magnitude. Furthermore, with respect to input intensity, the present invention also provides an improvement over the state of the art by at least three orders of magnitude.

The present invention is described in terms of this example environment. Description in these terms is provided for convenience only. It is not intended that the invention be limited to application in this example environment. In fact, after reading the following description, it will become apparent to a person skilled in the relevant arts how to implement the invention in other environments.

2. Nonlinear Interaction of Light with Matter a. Susceptibility

At a qualitative level, all materials found in nature are nonlinear to some degree. Consequently, the characteristic properties of ordinary materials, such as the dielectric susceptibility, change if an applied electromagnetic field intensity is strong enough.

This dependence of the susceptibility (which ultimately is a statement of the index of refraction of the material) on applied electric field strength can be exemplified in the following way:

$$\chi = \chi^{(1)} + \chi^{(2)}E + \chi^{(3)}E^2 + \ldots \chi^{(j)}E^{j-1} \ldots + \ldots$$

where j is an integer, $\chi^{(1)}$ is the medium susceptibility for low incident fields, $\chi^{(j)}$ is the jth nonlinear coefficient whose magnitude decreases rapidly as (j) increases, and E is the applied field. Therefore, contributions from the jth term become significant if the field strength is gradually increased. Typically, each $\chi^{(j)}$ coefficient can be two to four orders of magnitude greater than each successive $\chi^{(j+1)}$ coefficient, depending on the material. On the other hand, all the coefficients with odd or even (j) greater than one may vanish, depending on the characteristics of the material at the molecular level. For example, all the even coefficients vanish if the molecule has a geometrical center of symmetry, as in a gas.

Because of the nonlinear contributions to the dielectric susceptibility, the application of a strong external optical field at frequency $\omega$ is capable of generating light at frequency $2\omega$, $3\omega$, $4\omega$, and so on. By the same token, if two strong fields of different frequencies $\omega_1$ and $\omega_2$ are applied to the nonlinear material, light at frequencies $(\omega_1 + \omega_2)$ and $(\omega_1 - \omega_2)$ (i.e., sum and difference frequencies) can also be generated in addition to the individual harmonics. For example, a $\chi^{(2)}$ medium, which means that the first order nonlinear coefficient dominates the dynamics, is capable of second harmonic (SH) generation, and sum and difference frequency conversion. A $\chi^{(3)}$ medium is capable of third harmonic generation, and so on. Therefore, PBG structures are well suited for frequency conversion applications.

b. Cascading

Frequency conversion applications utilize PBG structures that allow highly efficient energy conversion from a pump beam at one frequency to a second beam at a second frequency. These pump beams generate a first field at a fundamental frequency (FF) and a second field at a second harmonic (SH) of the fundamental frequency. In these particular applications, the group velocity, tuning, and phase matching conditions between the FF and SH fields are chosen to obtain maximum conversion efficiency.

Maximum conversion efficiency describes the situation where the amount of energy at a fundamental frequency that is converted to energy at a second harmonic is maximized. To achieve maximum conversion efficiency, conditions are chosen such that the FF and SH fields are phase matched. As a result of this phase matching, the waves associated with each field propagate with the same effective index of refraction. This phase matching is one of the factors that causes a high conversion efficiency. For the purposes of discussion, the term effective index means that the FF and SH fields experience a sort of averaged index of refraction, even though the interaction takes place in a layered structure. This principle is described in Centini, M. et al., "Dispersive properties of finite, one-dimensional photonic band gap structures: Applications to nonlinear quadratic interactions," *Physical Review E*, Vol. 60, No. 4-B, October 1999, pp. 4891–4898 (incorporated herein by reference in its entirety).

Conditions can be established where there is not phase matching between the waves. When such conditions are established in a bulk medium, a phenomena known as "cascading" occurs. Cascading refers to the flow of energy back and forth from one field to the other in a cascaded fashion. This effect is caused by the absence of phase matching energy and is well known to persons skilled in the relevant arts. When cascading occurs, the number of times that energy cycles between one field and the other depends on the length of the medium, the input intensity, and the magnitude of the nonlinear coupling coefficient. Cascading is described by R. De Salvo, D. J. Hagan, M.Sheik-Bahae, G. Stegeman, H. Vanherzeele, E. W. Van Stryland, Optics Letters Volume 17, page 28 (1992) (incorporated by reference herein in its entirety).

Cascading produces phase shifts in the interacting fields. For a particular FF field, the extent of cascading, and the magnitude of the resultant FF field phase shift, depend on at least two factors. These factors are the tuning of the FF and SH fields, and the input intensity of the FF field.

3. Nonlinear Phase Shifting Using a PBG Structure

The past two decades have witnessed an intense investigation of electromagnetic wave propagation phenomena at optical frequencies in periodic structures. These structures are usually referred to as photonic band gap (PBG) crystals. PBG crystals are well known to persons skilled in the relevant arts. Two references describing PBG crystals are *Development and Applications of Materials Exhibiting Photonic Band Gaps*, edited by C. M. Bowdwen, J. P. Dowling, and H. O. Everitt, special iussue of J. Opt. Soc. Am. B 10, 279 (1993); and J. D. Joannopoulos, et al., *Photonic Crystals*, Princeton University Press, Princeton, 1994. These references are incorporated herein by reference in their entirety.

Many practical applications of this new technology can be achieved at least in one dimension, for linear and nonlinear systems. Examples of these practical applications include optical diodes, nonlinear optical limiters and diodes, efficient nonlinear frequency conversion, optical delay lines, and transparent metals. These devices are based on the physics of the photonic band edge.

The present invention utilizes yet another effect that can occur near the band edge. Namely, the present invention enhances nonlinear $\chi^{(2)}$ cascading processes by several orders of magnitude with respect to a bulk medium. Limited cascading processes for a bulk medium are described in R. De Salvo, D. J. Hagan, M. Sheik-Bahae, G. Stegeman, H. Vanherzeele, E. W. Van Stryland, *Opt. Lett.* 17, 28 (1992); G. Assanto, "Quadratic Cascading: Effects and Applications" in *Beam Shaping and Control with Nonlinear Optics*, F. Kajzar and R. Reinisch eds. (Plenum Press, New York, 1998) pp. 341–374.

Furthermore, the present invention enables an increase in the density of modes (DOM). In one example, the phase mismatch between fundamental frequency (FF) and second harmonic (SH) fields produce phase shifts that are of order $\pi$ for input intensities of only 10 megawatts per square centimeter.

In the following paragraphs, a device according to a preferred embodiment is described. Next, a formal analysis is provided to quantitatively describe the phase shift performance of the present invention. In particular, this analysis describes one example of a mismatch that is used for the enhancement of $\chi^{(2)}:\chi^{(2)}$ processes near the band edge.

4. PBG Structure

Figure 1:
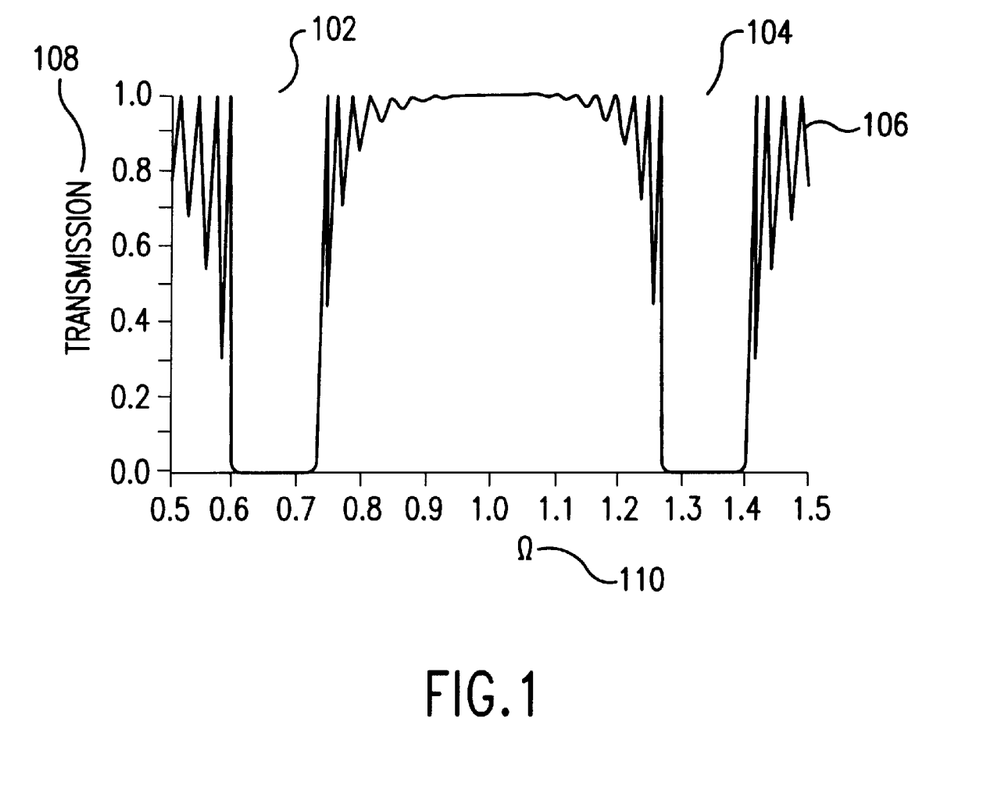
FIG. 1 is a graph illustrating a characteristic transmission profile for a PBG structure.

Photonic band gap (PBG) structures inhibit propagation for a range of frequencies about some reference frequency. Such frequency ranges are known as band gaps. PBG structures allow propagation for other frequency ranges that are away from band gaps. A representative transmission profile for a photonic band gap structure is shown in FIG. 1. This figure shows a characteristic transmission profile for a PBG structure. In FIG. 1, both a first order band gap 102 and a second order band gap 104 are depicted. A typical PBG structure exhibits an infinite number of photonic band gaps and band edges that are adjacent to the band gaps. In FIG. 1, transmission profile 106 is obtained by plotting the optical transmission 108 as a function of normalized frequency ($\Omega$) 110, where $\Omega=\omega/\omega_0$. $\omega_0$ is a reference frequency used to create a normalized frequency scaling. The maximum possible transmission is 1, which corresponds to 100%.

Therefore, it is the absence of those frequencies from the transmitted spectrum that gives rise to the name "band gap", in analogy to the electronic band gap of semiconductors where electrons having a specific range of energies cannot propagate inside a semiconductor crystal.

At frequencies outside the photonic band gap, the properties of the structures are such that a series of transmission resonances are obtained. These peaks are also referred to as peaks of transmittance. The number of such resonances is equal to the number of periods that make up the structure. The bandwidth of said resonances is a sensitive function. For a particular PBG structure, this function depends on the total number of periods, and each layer's refractive index.

Figure 2A:
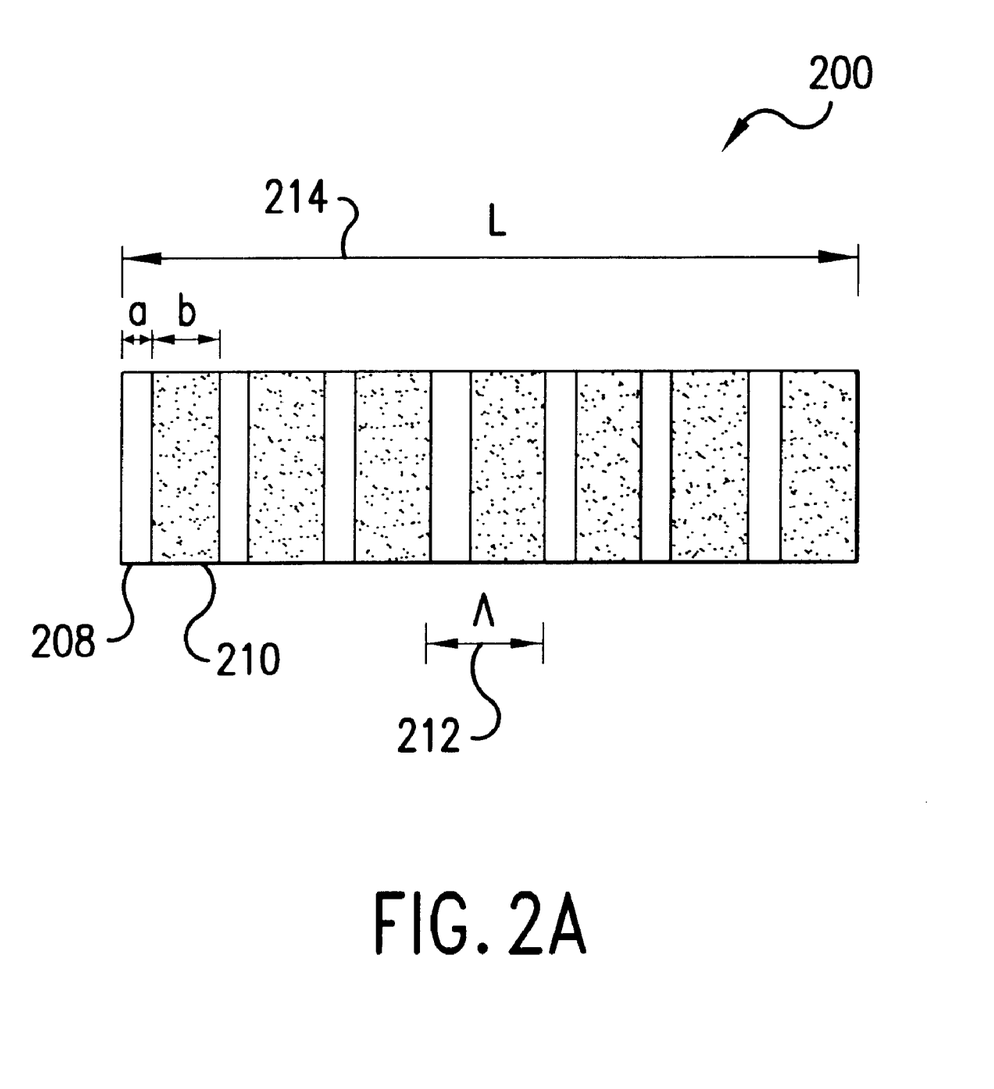
FIG. 2A is a one-dimensional, finite, N-period structure comprising pairs of alternating layers of high and low linear refractive index according to a preferred embodiment.

FIG. 2A illustrates a photonic band gap (PBG) structure 200 according a preferred embodiment of the present invention. In one dimension, photonic band gap structure 200 comprises a plurality of layers, where the plurality of layers alternates between a low and a high index of refraction. PBG structure 200 comprises a stack of alternating layers 208 and 210 of refractive materials having predetermined indices of refraction $n_1$ and $n_2$, and predetermined thicknesses, a and b, respectively. Alternating layers 208 and 210 may also have different $\chi^{(2)}$ responses. PBG structure 200 has a period 212 that is defined by the length of two adjacent alternating layers 208 and 210. The magnitude of period 212 is represented by the symbol $\Lambda$, where $\Lambda=a+b$. PBG structure 200 comprises N periods, and has a total length 214. Total length 214 is represented by the symbol L, where $L=N\Lambda$.

In an alternate embodiment, a PBG structure comprises layers of varying thickness and indices of refraction. As long as the structure produces a photonic band gap transmission profile, this layering may be quasi-periodic, non-periodic, or random in thickness and/or index of refraction.

PBG structures according to the present invention may also be based on metallic PBG structures. As set forth above, PBG devices may comprise a plurality of alternating material layers. In an alternate embodiment, the first material component is a transition metal. This metal can be gold, silver, copper, aluminum, tungsten, bismuth, or in general a good conductor of electricity with properties similar to those of gold, silver, copper, etc. The second material component is a dielectric or semiconductor material. For example, glasses such as quartz or magnesium fluoride ($MgF_2$) can be used, and semiconductors such as gallium arsenide, aluminum arsenide, or germanium can also be used. Further, any alloy or other material that can be combined with a metallic substance can also be engineered and used for this purpose. This combination of materials results in a new index of refraction and new absorption characteristics for the PBG structure. These properties can depend on the respective proportions of the materials used in the structure. It should be noted, however, that similar structures that use different metals can respond to the same photonic signal in very different ways. Also, the ordering of the metal/dielectric structure can be interchanged to a dielectric/metal structure without affecting the transmissive properties of the PBG structure. In an example, an aperiodic structure has aperiodic layers.

As an example to illustrate the alternate embodiment described in the above paragraph and its operation, a transparent metal PBG structure can be fabricated with the component layers of silver (Ag), a metal, and magnesium fluoride ($MgF_2$), a glass. Here, the total amount of Ag in the transparent metal PBG device can be hundreds of skin depths in thickness. Similarly, the thickness of the $MgF_2$ layers can also vary.

In particular, the transparent metal shielding device is a PBG structure comprising several alternating Ag/MgF$_2$ layers deposited on a glass, or any other suitable substrate. For some applications, it can be desirable that the transmitted range of frequencies not be in the visible range. Thus, the substrate can be opaque to visible light. For example, semiconductor substrates such as aluminum arsenide (AlAs) and gallium arsenide (GaAs) can also be used as a substrate, depending on what transmission window is desired.

According to the present invention, PBG device 200 generates a photonic signal having a phase different from an input photonic signal incident on PBG structure 200. The input photonic signal has a frequency, a bandwidth, and an input intensity. The interaction of the input signal with the arrangement of layers of PBG structure 200 generates a phase shift.

In an alternate embodiment, input photonic signals may have complex spectra. For example, an input photonic signal may comprise fundamental frequency and second harmonic fields. In addition, input photonic signals may comprise additional harmonics as well as other non-harmonic spectral components.

As discussed with respect to the numerical model described in the paragraphs below, the present invention enables structures less than 10 microns in length to perform phase shifts of order π for input signals where the input intensity is less than 100 megawatts per square centimeter, and in any case, much smaller compared to current state of art devices. As stated above, one embodiment of the present invention is an improvement over current examples in the art in device length by three orders of magnitude. Also, this is an improvement over the current examples in the art in required input signal intensity by three orders of magnitude. The improvement in device length allows phase shifting techniques to be miniaturized and integrated into the micro electronic circuit environment. The improvement in required input intensity lowers necessary thresholds and allows phase shifting techniques to be achieved with ordinary laser sources. Features of the present invention are shown in the paragraphs below using a multiple scales formalism which is well known to persons skilled in the relevant arts and described in J. W. Haus, R. Viswanathan, M. Scalora, A. G. Kalocsai, J. D. Cole, and J. Theimer, Phys. Rev. A. 57, 2120 (1998) (incorporated herein by reference in its entirety). These paragraphs provide an extensive summary of the theory behind the present invention as well as a description of a device according the present invention.

5. Formal Analysis

According to the present invention, an analytical model can be utilized to allow one of ordinary skill in the art to design PBG structure 200 to obtain desired phase shifts for a particular application. This model extends the analysis of the cascading effect to ultimately quantify the phase shift of a field that is input to PBG structure 200. This phase shift is dependent on the input field's intensity.

The coupled mode equations that govern the interaction of two monochromatic plane waves at a fundamental frequency (FF) ω and a second harmonic (SH) 2ω in a layered 1-D structure are given by the following two differential equations (1a) and (1b).

$$\frac{d^2 A_\omega}{dz^2} + k_\omega^2 A_\omega = -\lambda \alpha A_\omega^* A_{2\omega} \tag{1a}$$

$$\frac{d^2 A_{2\omega}}{dz^2} + k_{2\omega}^2 A_{2\omega} = -2\lambda \alpha A_\omega^2 \tag{1b}$$

where $k_\omega = k_0 n_\omega(z)$, $k_{2\omega} = 2k_0 n_{2\omega}(z)$, and $k_0 = \omega/c$.

In the above equations, α is the nonlinear coupling coefficient, and is represented by the following expression.

$\alpha = 2k_0^2 d^{(2)}(z)$.

$n_\omega(z)$ and $n_{2\omega}(z)$ are the linear refractive indices along the propagation direction z. λ is a dimensionless parameter that identifies the contributions of a given perturbative order.

In order to separate fast and slow scale variation in space, a suitable multiple scale expansion is applied. A new set of n+1 independent variables $z_k = \lambda^k z$, with $z_0 = z$ and for k=0,1, 2, . . . , n is introduced. Then, the derivative operator is expanded according to the new set of coordinates, namely:

$$\frac{d}{dz} = \sum_{k=0}^{n} \lambda^k \frac{d}{dz_k}$$

The electric fields are also regarded as functions of the n+1 independent variables, namely:

$$A_{j\omega}(z_0, \ldots, z_n) = \sum_{k=0}^{n} \lambda^k A_{j\omega}^{(k)}(z_0, \ldots, z_n) \text{ with } j = 1, 2.$$

To first order perturbation theory, and to zeroth order in λ, the first term in the expansion of the electric field can be expressed in the following form.

$A_{j\omega}^{(0)}(z_0, z_1) = A_{j\omega}(z_0) \tilde{A}_{j\omega}(z_1)$ $\tilde{A}_{j\omega}(z_1)$ is the field envelope that depends on the slowly varying variable $z_1$. $A_{j\omega}(z_0)$ is the fast oscillating linear eigenmode that solves the standard Helmholtz equation (2) for the structure.

$$\frac{d^2 A_{j\omega}}{dz_0^2} + k_{j\omega}^2(z_0) A_{j\omega} = 0, j = 1, 2 \tag{2}$$

Standard Helmholtz equation (2) is subject to the standard boundary conditions at the input ($z_0=0$) and the output interfaces ($z_0=L=N\Lambda$). These boundary conditions are provided below.

$1 + r_{j\omega} = A_{j\omega}(0)$ $t_{j\omega} = A_{j\omega}(L)$ $ik_0(1 - r_{j\omega}) = dA_{j\omega}(0)/dz_0$ $ik_0 t_{j\omega} = dA_{j\omega}(L)/dz_0$ In the boundary conditions listed above, $r_{j\omega}$ and $t_{j\omega}$ are the linear reflectivity and transmittivity coefficients of the structure, respectively. The constant i is the square root of −1. The constant, $k_0$, is the wavevector of the linear homogeneous medium that surrounds the structure. In addition, the linear eigenmodes are normalized with respect to the amplitude of the input fields.

The problem of solving equation (2) with the boundary conditions at the input and output interfaces may be regarded as a boundary eigenvalue problem. Under the conditions that both the FF and SH fields are tuned at a peak of transmission, the spectrum of the eigenvectors of Equation (2) has the form shown below in equation (3).

$$|j\omega, m_j\rangle = e^{i\frac{m_j\pi}{N\Lambda-0}} U_{j\omega,m_j}(z_0), \qquad (3)$$

where $m_j=1,2,\ldots,(N-1),(N+1),\ldots,(2N-1),(2N+1),\ldots$

In equation (3), $U_{j\omega,m_j}(z_0)$ are real functions of period L. In essence, $$U_{j\omega,m_j}(0)=U_{j\omega,m_j}(N\Lambda)$$

when the following orthogonality relationship is met.

$$\langle j\omega,l_j|\epsilon_{j\omega}|j\omega,m_j\rangle = C_{j\omega,m_j}\delta_{l_j,m_j}$$

where $\delta_{l_j,m_j}$ is a delta impulse function. In the above orthogonality relationship, $$C_{j\omega,m_j} = \int_0^{N\Lambda} \epsilon_{j\omega} U_{j\omega,m_j}^2 \, dz_0, \text{ and}$$

$$\epsilon_{j\omega} = n_{j\omega}^2(z_0).$$

Equation (3) is not calculated when mi equals integer multiples of N. This is because the corresponding eigenmodes are tuned at the band edge. At the band edge, the transmittance is zero.

In a preferred embodiment, PBG structure 200 comprises alternating layers of $Al_2O_3$ and $Al_{30\%}Ga_{70\%}As$. However, for the $Al_{30\%}Ga_{70\%}As$ layer, other percentages may be used. These materials are well known to persons skilled in the relevant arts. The refractive index of $Al_2O_3$ is approximately constant (1.62) over the range of wavelengths of interest. However, the refractive index of $Al_{30\%}Ga_{70\%}As$ is more complicated. For the purposes of this discussion, the refractive index $Al_{30\%}Ga_{70\%}As$ is based on measured data published on the internet by SOPRA: Société de Production et Recherches Appliquées.

Figure 2B:
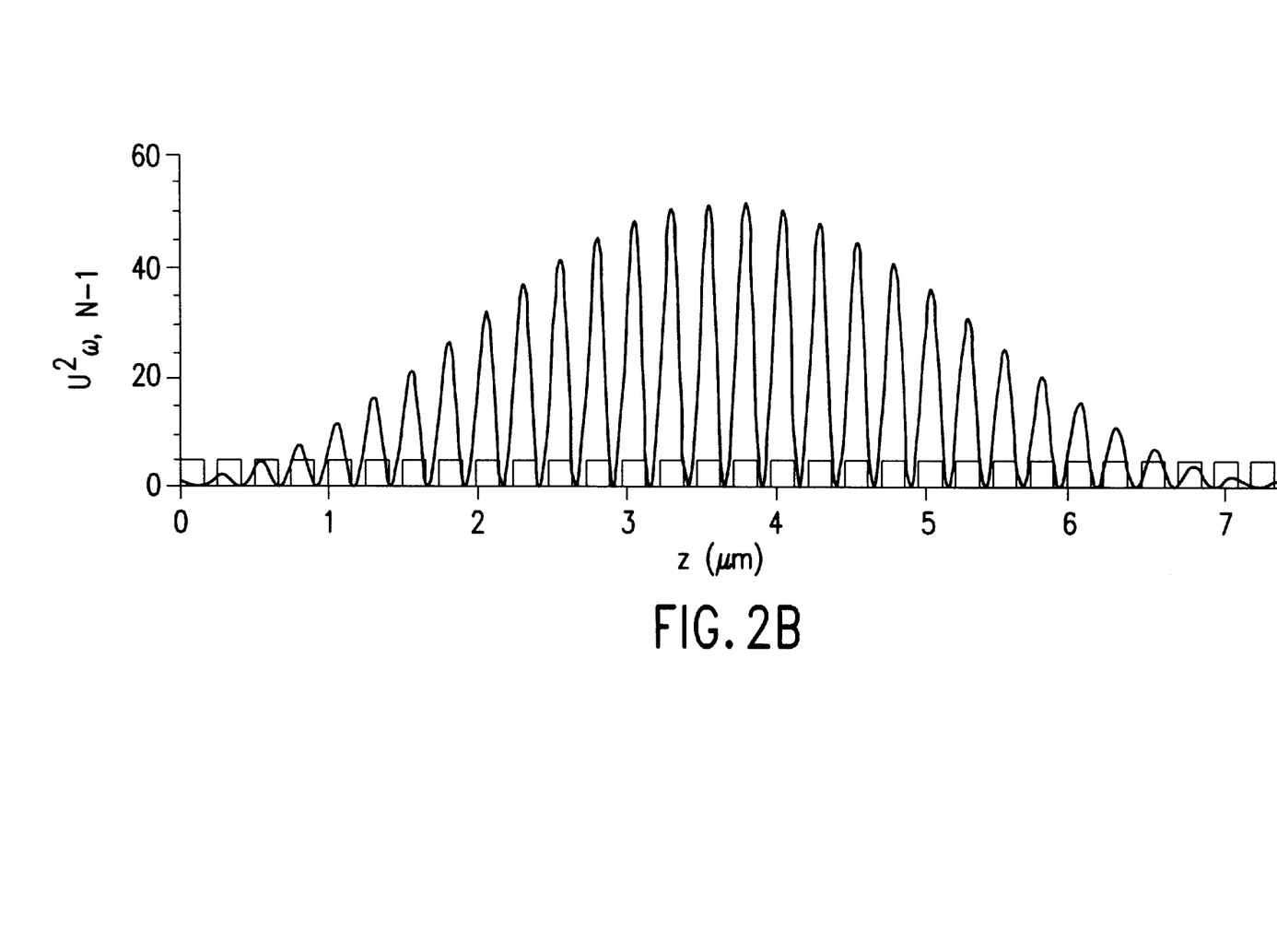
FIG. 2B is a graph illustrating the normalized intensity of the eigenmode for a fundamental frequency field according to a preferred embodiment.

FIG. 2B is a graph illustrating the normalized intensity $U^2_{\omega,N-1}$ of the eigenmode for an FF field according to a preferred embodiment. Here, PBG structure 200 is a 30-period stack. In this case, layer thicknesses a and b are 93 nanometers and 154 nanometers, respectively. Layers 208 comprise $Al_2O_3$ and layers 210 comprise $Al_{30\%}Ga_{70\%}As$. The FF field is tuned at the (N-1)th peak of transmittance near the first band edge, and the eigenrnode for the SH field is tuned at the first resonance near the second order band edge.

Figure 2C:
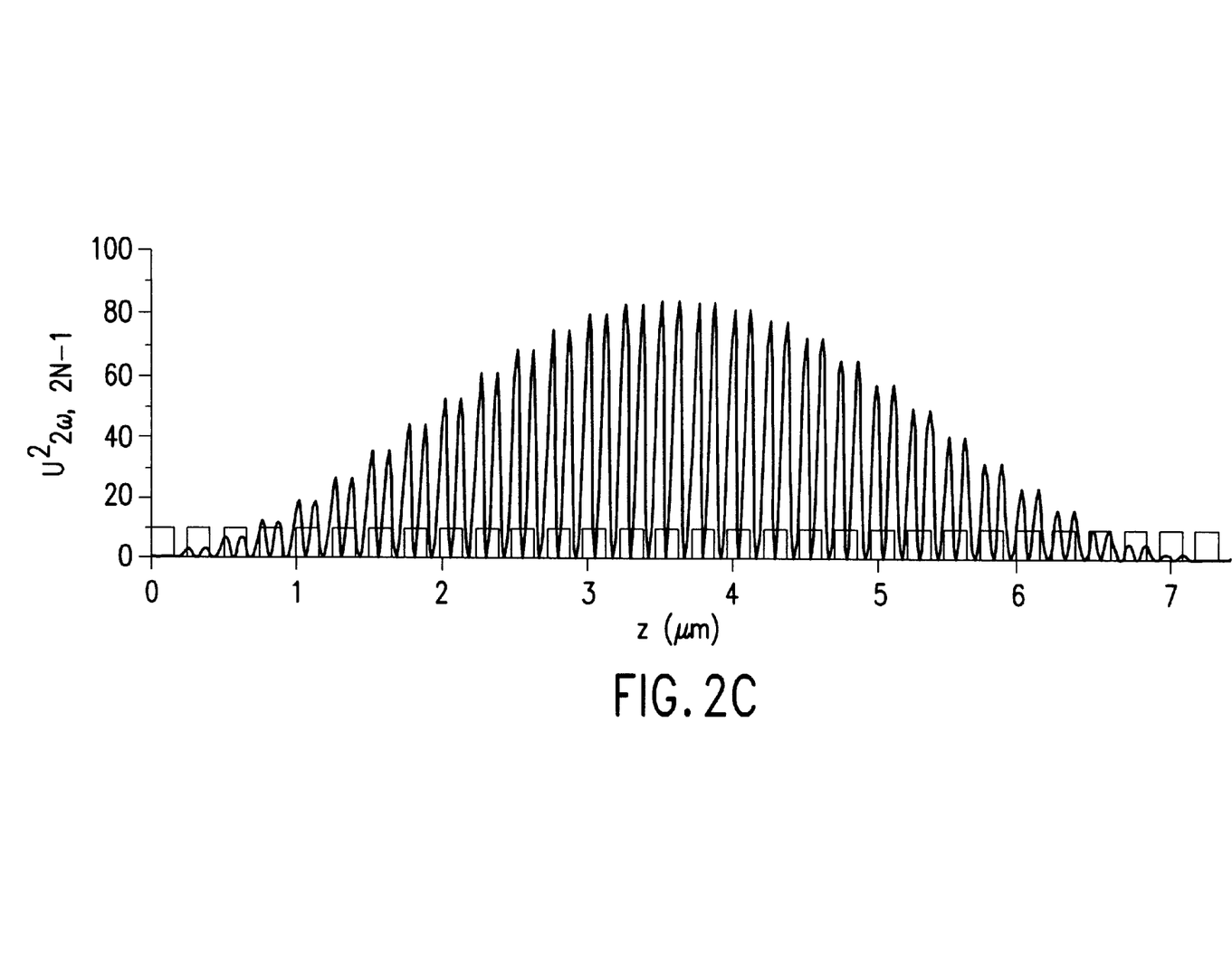
FIG. 2C is a graph illustrating the normalized intensity of the eigenmode for a second harmonic field according to a preferred embodiment.

In a preferred embodiment, the thickness of layers 208 and 210 for PBG structure 200 are chosen such that when combined with material dispersion, the SH eigenmode is tuned at the (2N-1)th peak of transmittance near the second order band edge. This tuning is illustrated in FIG. 2C.

It is important to note that the eigenfunctions defined in equation (3) are similar but not identical to the Bloch functions that are generally used in the problem of nonlinear optical interactions in periodic media. However, there is a fundamental difference between the eigenfunctions defined in equation (3) and Bloch functions. Bloch functions are periodic over length $\Lambda$ of period 112. The family of eigenftinctions in equation (3) are periodic over the total length 114 of PBG structure 200. This difference in the periodicity properties comes from considering a structure of finite length with boundary conditions at the input and output interfaces. Therefore, in the present invention, the translational invariance of the eigenmodes over the elementary cell is broken, and a long-range periodicity that is given by the length of PBG structure 200 is introduced. This long-range periodicity is shown in FIGS. 2B and 2C.

Next, if the perturbation analysis is carried out to the first order in $\lambda$, a different set of coupled mode equations are obtained by performing a sequence of two steps. First, the secular terms are eliminated in $$A_{j\omega}^{(1)}(z_0,z_1).$$

Second, under the usual rotating wave approximation, and the orthogonality condition for the eigenstates of equation (3), the following coupled-mode equations, 4(a) and 4(b), for the field envelopes in the slow variable $z_1$ are obtained. It is important to note that this analysis has formally taken $z_1$ to z.

$$\frac{d\tilde{A}_\omega}{dz} = i\omega\rho_\omega\gamma_\omega\tilde{A}_{2\omega}\tilde{A}_\omega^*, \qquad (4a)$$

$$\frac{d\tilde{A}_{2\omega}}{dz} = i\omega\rho_{2\omega}\gamma_{2\omega}^*\tilde{A}_{2\omega}\tilde{A}_1^2, \qquad (4b)$$

where $$1/\rho_{j\omega} = \frac{c^2\left\langle j\omega, m_j \left| -i\frac{d}{dz_0} \right| j\omega, m_j \right\rangle}{j\omega C_{j\omega,m_j}}, \text{ and}$$

$$\gamma_{j\omega} = \frac{1}{C_{j\omega,m_j}} \int_0^{N\Lambda} U_{\omega,m_1}^2 U_{2\omega,m_2} d^{(2)}(z_0)e^{i\Delta Kz_0} \, dz_0.$$

In the above equations, c represents the speed of light. $\Delta K$ is the phase mismatch, and is represented by the expression below.

$$\Delta K = (m_2 - 2m_1)\frac{\pi}{N\Lambda}.$$

It is important to note, that a straightforward analogy connects the bracket $$\left\langle j\omega, m_j \left| -i\frac{d}{dz_0} \right| j\omega, m_j \right\rangle$$

with the mean value of the momentum operator for electrons in a periodic potential. This operator is represented by the following expression.

$$\hat{p} = -i\hbar d/dz_0.$$

This straightforward analogy is described in N. W. Ashcroft and N. D. Mermin, Solid State Physics, Holt, Rinehart and Winston, New York, 765–766 (1976) (incorporated by reference herein in its entirety).

Consequently, the eigenstate of the electromagnetic field at the peak of transmittance (shown below) can be regarded as the Bloch eigenstate for the electron in an elementary cell of size $N\Lambda$.

$$\langle j\omega, m_j\rangle$$

Thus, the term $\rho_{j\omega}$ is identified as the DOM of the electromagnetic field inside PBG structure 200. The coupling coefficient $\gamma_{j\omega}$, reflects the way in which the eigenmodes of the FF and SH fields sample the distribution of the nonlinearity $d^{(2)}(z_0)$ inside PBG structure 200.

Figure 3A:
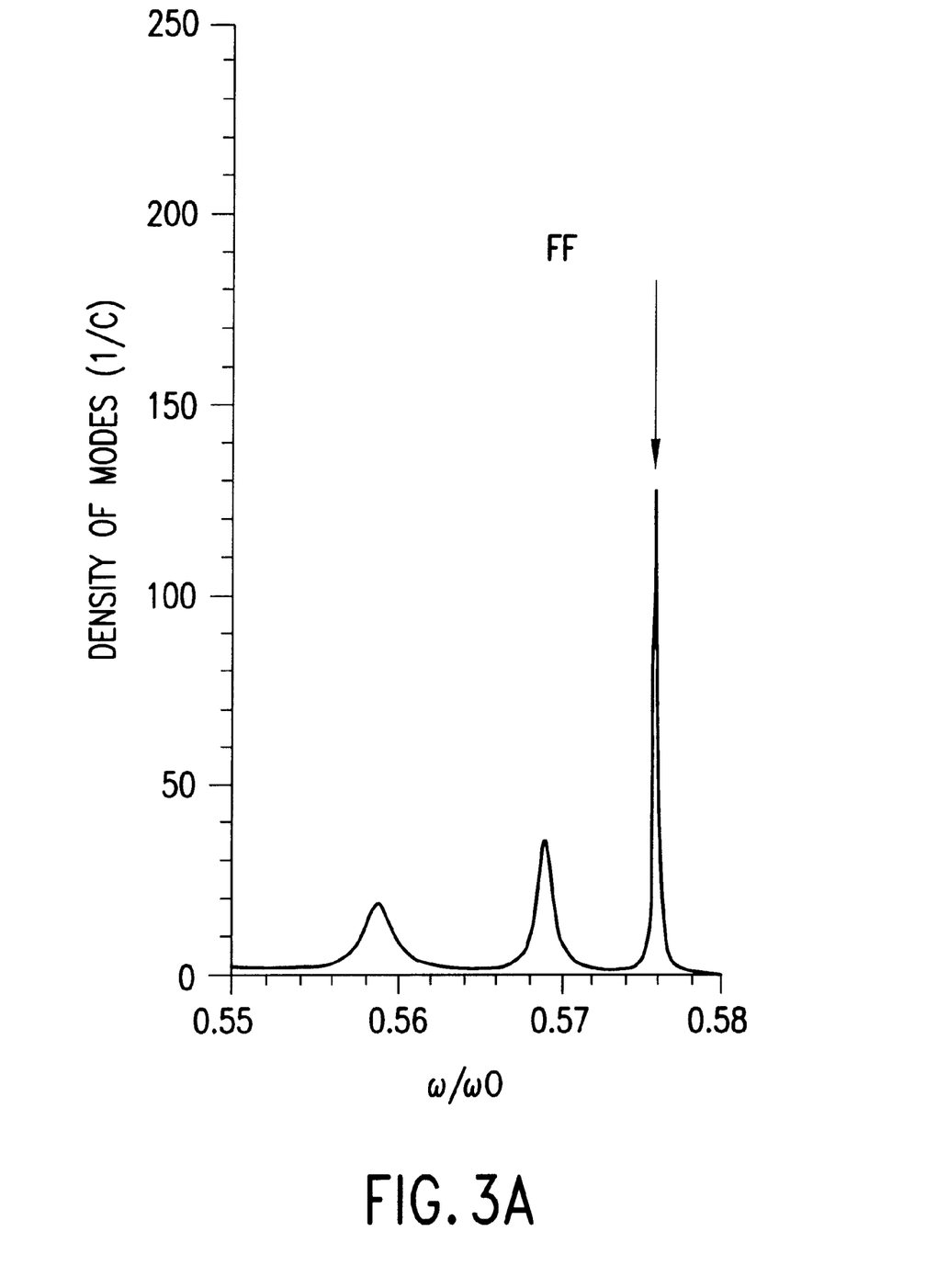
FIG. 3A is a graph illustrating the density of modes for a fundamental frequency field according to a preferred embodiment.
Figure 3B:
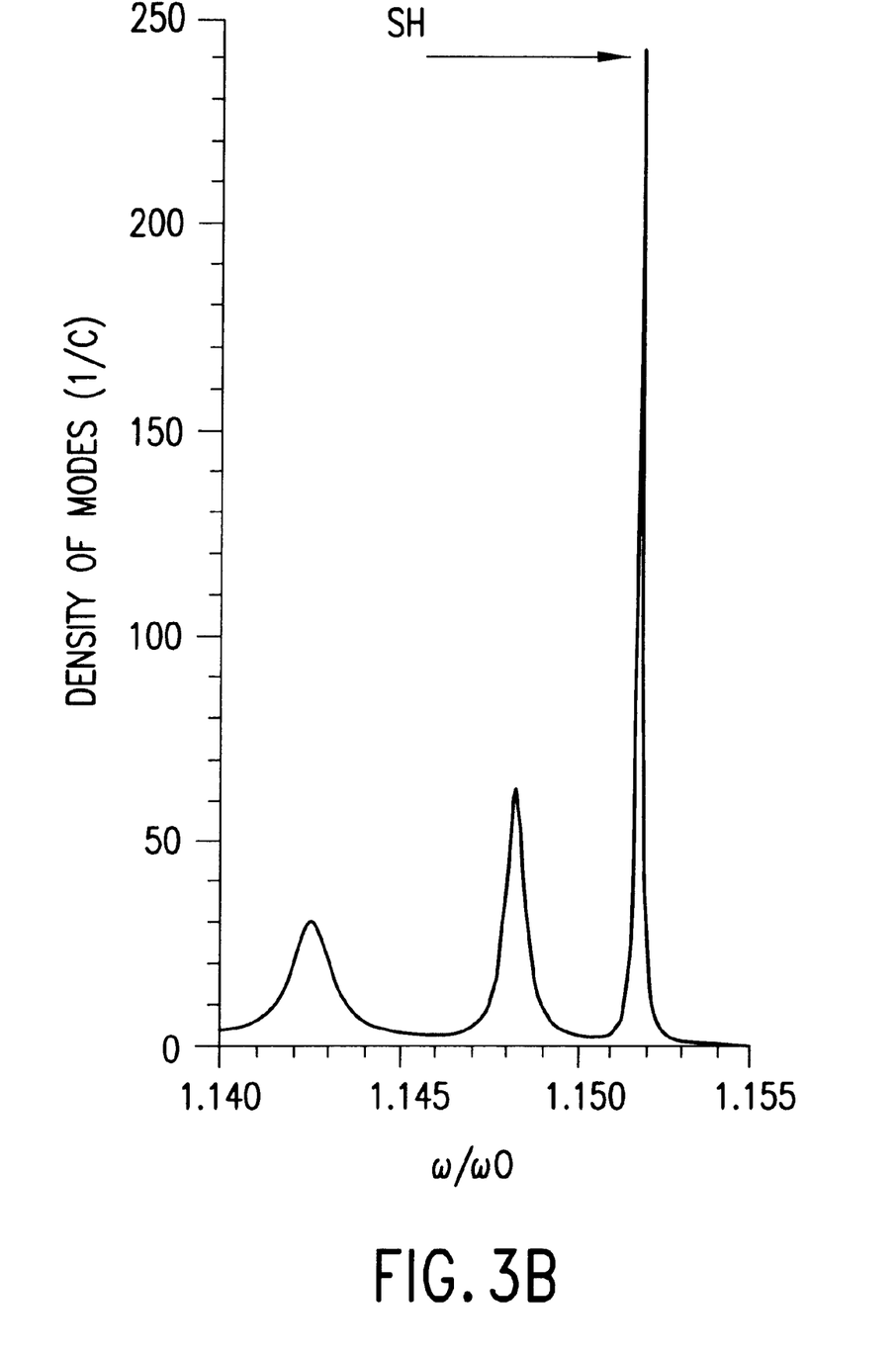
FIG. 3B is a graph illustrating the density of modes for a second harmonic field according to a preferred embodiment.

FIGS. 3A and 3B are graphs illustrating the DOM for the same PBG structure 200 that is described with reference to FIGS. 2A–2C. In these graphs, DOM is plotted in units of 1/c, and the FF and SH fields are tuned to the peak of transmittance near the first and the second band edges respectively. The quadratic interaction is mismatched by an amount $\Delta K=\pi/N\Lambda$. This mismatch causes a slow oscillation over a length scale equivalent to L, the structure length. The resulting relationship that governs these dynamics take the form shown below in equations (5a) and (5b).

$$\frac{d\tilde{A}_\omega}{dz} = i\sigma_\omega \tilde{A}_{2\omega}\tilde{A}_{1\omega}^* e^{i\frac{\pi}{N\Lambda}z} \quad (5a)$$

$$\frac{d\tilde{A}_{2\omega}}{dz} = i\sigma_{2\omega} \tilde{A}_\omega^2 e^{-i\frac{\pi}{N\Lambda}z} \quad (5b)$$

In equations (5a) and (5b), the real quantities, $\sigma_{j\omega}$, are the effective coupling coefficients, and are represented by the equation below.

$$\sigma_{j\omega} = \frac{\omega \rho_{j\omega} \int_0^{N\Lambda} d^{(2)} U_{\omega,N-1}^2 U_{2\omega,2N-1} dz_0}{\int_0^{N\Lambda} \varepsilon_{j\omega} U_{j\omega,jN-1}^2 dz_0}$$

Equations (5a) and (5b) are formally equivalent to those governing quadratic interactions in bulk materials under moderate phase mismatch conditions, namely $\Delta KL=\pi$. The effect of the PBG structure 200 is scaled in the effective coupling coefficients $\sigma_{j\omega}$. These coupling coefficients contain information regarding the DOM of the electromagnetic fields and the spatial average of the quadratic nonlinearity $d^{(2)}(z_0)$, also weighed by the amount of overlap of the linear eigenmodes.

Consequently, the effective coupling coefficients, $\sigma_{j\omega}$, are enhanced by several orders of magnitude in a PBG structure 200 with respect to an equivalent length of bulk material. This effect can be traced directly to the high DOM available near the band edge, as shown by equations (5a) and (5b).

Figure 4:
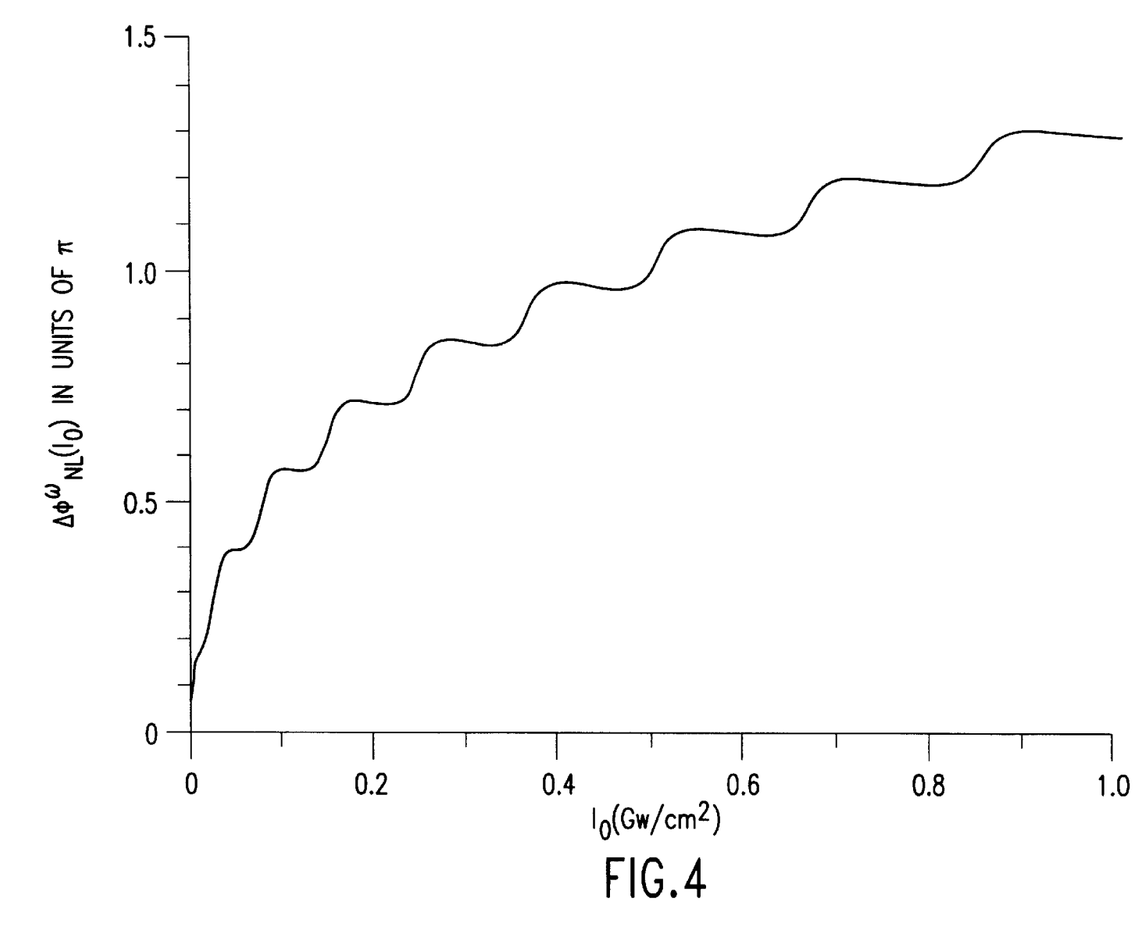
FIG. 4 is a graph illustrating the variation of nonlinear phase of a fundamental frequency field with respect to field intensity.

FIG. 4 illustrates the nonlinear phase modulation of a FF field as a function of input FF field intensity, for the PBG structure 200 as described with reference to FIGS. 2A–3B. The low index layer ($Al_2O_3$) is taken to be linear, while the high index layer ($Al_{30\%}Ga_{70\%}As$) is assumed to be nonlinear. PBG structure 200 is approximately 7 $\mu$m in length. In a preferred embodiment of the present invention, typical values of $\chi^{(2)}$ are of order 100 pm/V.

The graph in FIG. 4 shows that at the exit of the medium, the phase shift reaches values of order $\pi$ with modest FF intensities. These phase changes are remarkable because they are some three order of magnitude greater compared to those previously reported for bulk materials, and constitute a considerable improvement over current state of the art.

Finally, while the present invention considers relatively short devices and $\chi^{(2)}$ interactions as an example, the enhancement of the DOM near the band edge can lead to the same effect for other processes, such as frequency down-conversion and $\chi^{(3)}$ interactions near the band edge. Furthermore, the high DOM and the particular phase conditions available near the photonic band edge makes PBG structure 200 the best candidate for highly efficient, all-optical devices based on cascading quadratic nonlinearities. Although the above analysis contemplates a periodic structure, the effect of the enhancement of the cascading process is quite general for any kind of one dimensional layered lattice, whether periodic or not. As long as transmission resonances can be identified for a one dimensional layered lattice and symmetry properties of its eigenmodes exploited, similar phase shifts can be achieved.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all articles and patent documents mentioned above are incorporated by reference herein.

What is claimed is:

1. A device for generating an output photonic signal having a phase different from an input photonic signal incident on the device, the input photonic signal having an input photonic signal frequency, an input photonic signal bandwidth, and an input photonic signal intensity, comprising:
   a plurality of material layers;
   wherein said material layers are arranged such that the device exhibits a photonic band gap structure, wherein said photonic band gap structure exhibits a transmission band edge corresponding to the input photonic signal frequency, and wherein an interaction of the input photonic signal with said arrangement of layers generates a non-linear phase shift in the output photonic signal.

2. The device of claim 1, wherein said plurality of material layers comprises:
   a plurality of first material layers; and
   a plurality of second material layers.

3. The device of claim 2, wherein said first and second material layers are arranged in a periodically alternating manner such that the arrangement formed therefrom exhibits said photonic band gap structure.

4. The device of claim 2, wherein said first material layer has a first index of refraction and said second material layer has a second index of refraction, said first index of refraction and said second index of refraction being different.

5. The device of claim 2, wherein said first material layer has a first thickness and said second material layer has a second thickness, said first thickness and said second thickness being different.

6. A device for generating an output photonic signal having a phase different from an input photonic signal incident on the device, the input photonic signal having an input photonic signal frequency, an input photonic signal bandwidth, and an input photonic signal intensity, comprising:
   a plurality of material layers;
   wherein said material layers are arranged such that the device exhibits a photonic band gap structure, wherein said photonic band gap structure exhibits a transmission band edge corresponding to the input photonic signal frequency, and wherein an interaction of the input photonic signal with said arrangement of layers generates a phase shift in the output photonic signal, wherein said plurality of material layers comprises:
   a plurality of first material layers; and
   a plurality of second material layers, wherein said first and second material layers respectively comprise $Al_2O_3$ and $Al_{30\%}Ga_{70\%}As$ semiconductor layers, said first and second layers being formed on a semiconductor substrate.

7. The device according to claim 2, wherein a length of the device is less than 10 micrometers.

8. The device according to claim 2, wherein said phase shift is of order $\pi$.

9. A device for generating an output photonic signal having a phase different from an input photonic signal incident on the device, the input photonic signal having an input photonic signal frequency, an input photonic signal bandwidth, and an input photonic signal intensity, comprising:

a plurality of material layers;
   wherein said material layers are arranged such that the device exhibits a photonic band gap structure, wherein said photonic band gap structure exhibits a transmission band edge corresponding to the input photonic signal frequency, and wherein an interaction of the input photonic signal with said arrangement of layers generates a phase shift in the output photonic signal, wherein said plurality of material layers comprises:
   a plurality of first material layers; and
   a plurality of second material layers, wherein the input photonic signal is tuned at a first resonance near a first band edge and a second photonic signal is tuned at a first resonance near a second band edge.

10. The device of claim 9, wherein the second photonic signal is a second harmonic of the input photonic signal.

11. A device for generating an output photonic signal having a phase different from an input photonic signal incident on the device, the input photonic signal having an input photonic signal frequency, an input photonic signal bandwidth, and an input photonic signal intensity, comprising:

a plurality of material layers;
   wherein said material layers are arranged such that the device exhibits a photonic band gap structure, wherein said photonic band gap structure exhibits a transmission band edge corresponding to the input photonic signal frequency, and wherein an interaction of the input photonic signal with said arrangement of layers generates a phase shift in the output photonic signal, wherein said plurality of material layers comprises:
   a plurality of first material layers; and
   a plurality of second material layers, wherein the input photonic signal and a second photonic signal are phase mismatched.

12. The device of claim 11, wherein the second photonic signal is a second harmonic of the input photonic signal.

13. The device of claim 2, wherein said first and second material layers are arranged in an aperiodic manner.

14. A device for generating an output photonic signal having a phase different from an input photonic signal incident on the device, the input photonic signal having an input photonic signal frequency, an input photonic signal bandwidth, and an input photonic signal intensity, comprising:

a plurality of material layers;
   wherein said material layers are arranged such that the device exhibits a photonic band gap structure, wherein said photonic band gap structure exhibits a transmission band edge corresponding to the input photonic signal frequency, and wherein an interaction of the input photonic signal with said arrangement of layers generates a phase shift in the output photonic signal, wherein said plurality of material layers comprises:
   a plurality of first material layers; and
   a plurality of second material layers, wherein said first and second material layers respectively comprise $Al_2O_3$ and $Al_{30\%}Ga_{70\%}As$ semiconductor layers, said first and second layers being formed on a dielectric substrate.

15. A method of generating an output photonic signal having a phase different from an input photonic signal having an input photonic signal frequency, an input photonic signal bandwidth, and an input photonic signal intensity, comprising the steps of:

selecting the frequency and intensity of the input photonic signal so as to produce a second signal at a desired second harmonic frequency;
   providing a device comprising a plurality of material layers;
   wherein said material layers are arranged such that said device exhibits a photonic band gap structure, wherein said photonic band gap structure exhibits a transmission band edge corresponding to the input photonic signal frequency, and wherein an interaction of the input photonic signal with said arrangement of layers generates a non-linear phase shift in the output photonic signal; and
   inputting the input photonic signal into said device to generate said non-linear phase shift.

16. The method of claim 15, wherein said plurality of material layers comprises:

a plurality of first material layers; and
   a plurality of second material layers.

17. The method of claim 16, wherein said first and second material layers are arranged in a periodically alternating manner such that the arrangement formed therefrom exhibits said photonic band gap structure.

18. The method of claim 16, wherein said first material layer has a first index of refraction and said second material layer has a second index of refraction, said first index of refraction and said second index of refraction being different.

19. The method of claim 16, wherein said first material layer has a first thickness and said second material layer has a second thickness, said first thickness and said second thickness being different.

20. A method of generating an output photonic signal having a phase different from an input photonic signal having an input photonic signal frequency, an input photonic signal bandwidth, and an input photonic signal intensity, comprising the steps of:

selecting the frequency and intensity of the input photonic signal so as to produce a second signal at a desired second harmonic frequency;
   providing a device comprising a plurality of material layers;
   wherein said material layers are arranged such that said device exhibits a photonic band gap structure, wherein said photonic band gap structure exhibits a transmission band edge corresponding to the input photonic signal frequency, and wherein an interaction of the input photonic signal with said arrangement of layers generates a phase shift in the output photonic signal; and
   inputting the input photonic signal into said device to generate said phase shift, wherein said plurality of material layers comprises:
   a plurality of first material layers; and a plurality of second material layers, wherein said first and second material layers respectively comprise $Al_2O_3$ and $A_{30\%}Ga_{70\%}As$ semiconductor layers, said first and second layers being formed on a semiconductor substrate.

21. The method of claim 16, wherein said device has a length of less than 10 micrometers.

22. The method of claim 16, wherein said phase shift is of order $\pi$.

23. A method of generating an output photonic signal having a phase different from an input photonic signal having an input photonic signal frequency, an input photonic signal bandwidth, and an input photonic signal intensity, comprising the steps of:

selecting the frequency and intensity of the input photonic signal so as to produce a second signal at a desired second harmonic frequency;

providing a device comprising a plurality of material layers;

wherein said material layers are arranged such that said device exhibits a photonic band gap structure, wherein said photonic band gap structure exhibits a transmission band edge corresponding to the input photonic signal frequency, and wherein an interaction of the input photonic signal with said arrangement of layers generates a phase shift in the output photonic signal; and inputting the input photonic signal into said device to generate said phase shift, wherein said plurality of material layers comprises:

a plurality of first material layers; and a plurality of second material layers, wherein said first and second material layers respectively comprise $Al_2O_3$ and $Al_{30\%}Ga_{70\%}As$ semiconductor layers, said first and second layers being formed on a dielectric substrate.

24. A method of generating an output photonic signal having a phase different from an input photonic signal having an input photonic signal frequency, an input photonic signal bandwidth, and an input photonic signal intensity, comprising the steps of:

selecting the frequency and intensity of the input photonic signal so as to produce a second signal at a desired second harmonic frequency;

providing a device comprising a plurality of material layers;

wherein said material layers are arranged such that said device exhibits a photonic band gap structure, wherein said photonic band gap structure exhibits a transmission band edge corresponding to the input photonic signal frequency, and wherein an interaction of the input photonic signal with said arrangement of layers generates a phase shift in the output photonic signal; and inputting the input photonic signal into said device to generate said phase shift, wherein said plurality of material layers comprises:

a plurality of first material layers; and a plurality of second material layers, wherein the input photonic signal is tuned at a first resonance near a first band edge and a second photonic signal is tuned at a first resonance near a second band edge.

25. The method of claim 24, wherein the second photonic signal is a second harmonic of the input photonic signal.

26. The method of claim 25, wherein the input photonic signal and a second photonic signal are phase mismatched.

27. The method of claim 26, wherein the second photonic signal is a second harmonic of the input photonic signal.

28. A phase shifter device, comprising:

a plurality of material layers that exhibit a photonic band gap structure and that interact with an input photonic signal to generate an output photonic signal having a phase shift relative to the input photonic signal, wherein said plurality of material layers interact in response to the input photonic signal to generate an output photonic signal having a mismatched phase shift relative to the input photonic signal.

29. A phase shifter device, comprising:

a plurality of material layers that exhibit a photonic band gap structure and that interact with an input photonic signal to generate an output photonic signal having a phase shift relative to the input photonic signal, wherein said plurality of material layers have an interaction based on at least a $\chi^{(2)}$ susceptibility in the material layers.

30. A method for non-linear phase shifting, comprising the steps of:

tuning a plurality of material layers to exhibit a photonic band gap structure;

receiving an input photonic signal at said tuned plurality of material layers; and generating an output photonic signal having a non-linear phase shift relative to the input photonic signal based on interaction of the tuned material layers with the received input photonic signal.

31. The phase shifter device of claim 30, wherein said generating step generates an output photonic signal having a mismatched phase shift relative to the input photonic signal.

32. The phase shifter device of claim 30, wherein said generating step generates the output photonic signal based on at least a $\chi^{(2)}$ susceptibility in the tuned material layers.

* * * * *